June 5, 1956   J. C. RICH   2,749,133
CORE CHUCK
Filed Aug. 16, 1954
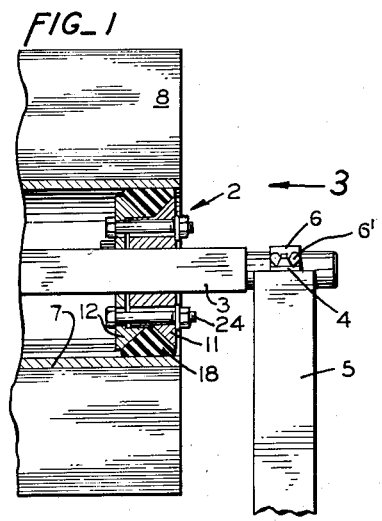
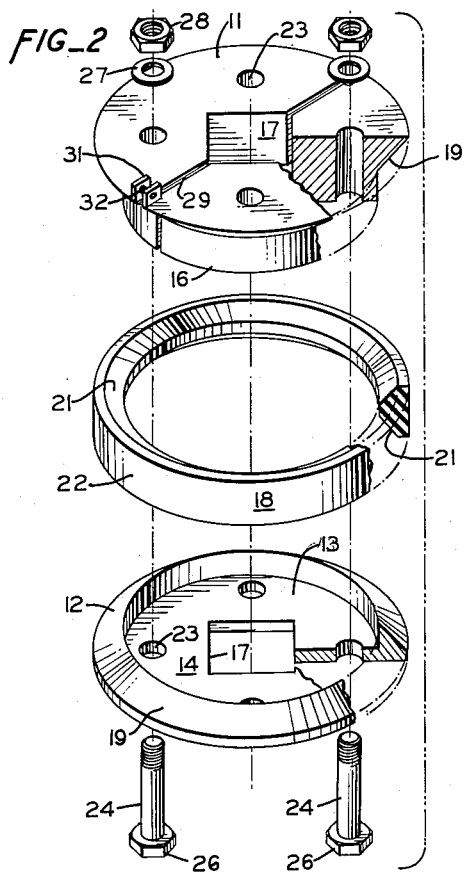
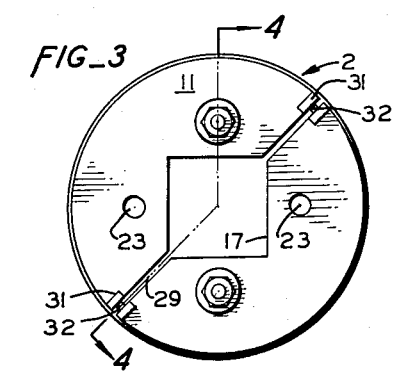
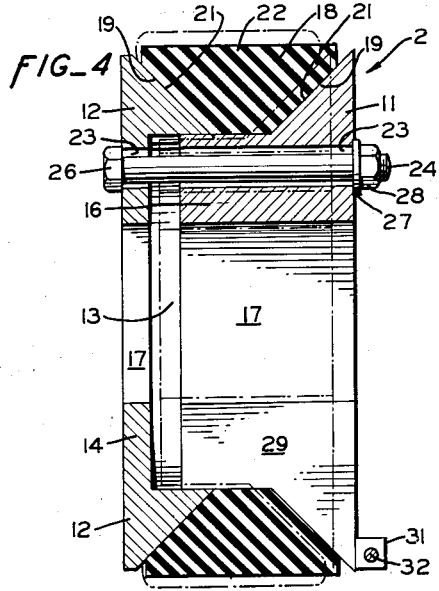
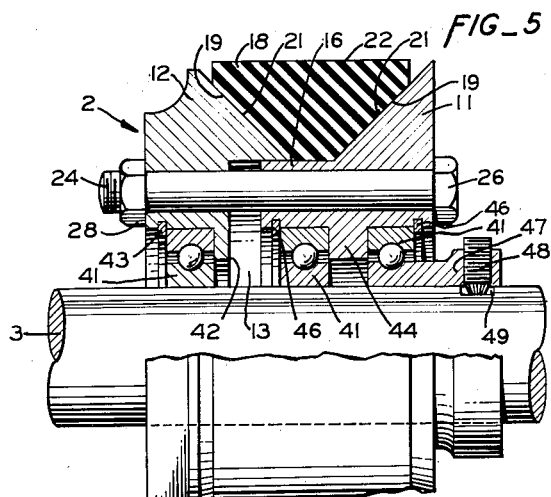
INVENTOR.
JAMES C. RICH
BY
Fryer + Johnson
ATTORNEYS

United States Patent Office 2,749,133
Patented June 5, 1956

2,749,133
CORE CHUCK

James C. Rich, Portland, Oreg.

Application August 16, 1954, Serial No. 450,031

9 Claims. (Cl. 279—2)

This invention relates to chucks, and more particularly to a so-called core chuck adapted for engaging a roll core upon or from which sheet paper or the like is being wound or unwound, respectively.

In the manufacture or handling of paper, it is common practice to wind a continuous sheet of paper as it is being manufactured or comes off any particular machine, on a core which is usually of metal, such as aluminum or steel, but which may be of any other suitable material; and, for example, when the roll of paper is to be subsequently treated, such as for application of a wax or the like coating thereto, the paper of the roll is then unwound so that it can be conducted to the treating apparatus. In such winding and unwinding of the paper, the core of the paper roll is detachably mounted on a shaft which is usually a rotatable shaft, but which may be nonrotatable.

In many instances, the described handling of the paper roll wound about the core is done at different locations or different plants. This necessitates the employment of removable chucks which will enable the core of the paper roll or the roll to be formed, to be mounted on the shaft. To obtain true winding and unwinding of the paper, it is necessary that the chuck hold the core in an accurately centered position without slippage. Otherwise, the sheet of paper being wound or unwound may be damaged; particularly under the high speed operation at which the various operations are conducted. Furthermore, it is desirable that no slippage occur between the chuck and the core or shaft, and that the torque load be uniformly applied between the shaft and the core.

A common form of chuck employed in plants of the character related embodies a pneumatic tire which when expanded with air is intended to grip frictionally the internal surface of the core. However, such arrangement is not all to be desired in effecting a positive clamping action so as to provide accurate centering on the shaft. Furthermore, such type of chuck is relatively expensive. Also, because of slippage which occurs, and the pneumatic character of the chuck, vibration obtains causing noise, wear and tear on the shaft bearings and a safety hazard.

Summarizing this invention, it has as its objects, among others, the provision of a chuck for the purpose particularly related, although it may be employed for other purposes, which will overcome the previously mentioned problems, is of simple and economical construction, composed of relatively few and simple parts enabling the chuck to be quickly positioned on or removed from the roll core, provides for accurate centering of the roll on the shaft, positive holding of the core on the shaft without slippage and with even distribution of torque load, and which provides minimum maintenance and replacement costs. Other objects will become apparent from a perusal of the following description.

The chuck consists essentially of three main parts, namely, a pair of ring members adapted to be positioned about the shaft upon which the core is mounted, and a band of elastic material between such members. At least one of the ring members and the band have cooperating tapered side surfaces to facilitate outward radial expansion of the band when the ring members are moved axially toward each other to compress the band, so that such radial expansion of the band will cause it to engage frictionally the inside of the roll core with a uniform grip. Suitable means is provided enabling the ring members to be moved axially relative to each other. In the case where the chuck is to be fixedly mounted on a rotating shaft, one of the ring members is split so that when the elastic band is compressed, it can also expand radially inwardly and cause the split parts to grip the shaft firmly.

In greater detail, and referring to the drawings,

Fig. 1 is a fragmentary longitudinal sectional view, partly in elevation, of the chuck of this invention mounted on a rotating shaft and frictionally engaging the inside surface of a roll core upon which paper is wound.

Fig. 2 is an exploded view of the chuck assembly, with parts broken away and shown in section, to illustrate more clearly the construction.

Fig. 3 is an end elevational view of the chuck looking in the direction of arrow 3 in Fig. 1

Fig. 4 is a sectional view, taken in planes indicated by the section line 4—4 in Fig. 3.

Fig. 5 is a fragmentary sectional elevation of a modified construction wherein the chuck is rotatably mounted on a fixed shaft.

Fig. 1 illustrates chuck 2 fixedly mounted on shaft 3 rotatably journalled in bearing 4 mounted on support 5 and having cap 6 conventionally hinged at one end and secured at the opposite end by nut 6'; the chuck firmly frictionally engaging the inside surface of core 7 upon which a roll of paper 8 is wound. The opposite end (not shown) of the roll core is detachably supported in a similar manner. The core with the paper roll thereon can be quickly detached simply by loosening each of the chucks by virtue of the chuck construction to be described, lifting bearing caps 6 after unscrewing nuts 6' whereupon the shaft can be lifted from the bearings and slipped out axially of the core, and the chucks removed. In a reverse manner, an empty core about which a web is to be wound can be positioned on the bearings.

Chuck 2 comprises a pair of spaced rings of any suitable material, preferably steel. One of these rings 11 is an inner or male member and the other ring 12 an outer or female member. A cylindrical internal recess 13 is formed in ring 12 which is bounded at the outer end by a flange 14; and an inwardly projecting, cylindrical hub portion 16 formed on male ring 11 is piloted for axial slidable movement in recess 13. Both of rings 11 and 12 are formed with central alined apertures 17 so that the rings may be positioned about shaft 3, the shape of the apertures being complementary to the cross-sectional shape of the shaft.

The shaft is usually non-circular in cross-section except at the bearings, generally square shaped; and accordingly, apertures 17 are of a complementary non-circular shape so that the rings can fit about the shaft without turning on the shaft. However, although the non-circular cross-sectional shape of apertures 17 and shaft 3 are preferred, they may be of circular shape if so desired, as the gripping effect created by the chuck to be described, will prevent turning of the chuck.

A circular ring or band 18 of suitable elastic material, preferably solid rubber, fits on and is supported by hub 16 between rings 11 and 12. At least one of the rings and the band are provided with cooperating tapered side surfaces to provide a wedge effect and thus facilitate outward radial expansion of the band when the rings are moved axially toward each other to clamp and compress the band. For best results, each of the rings and both sides of the band are provided with such cooperating tapered surfaces.

For this purpose, the inner side of each ring 11 and 12 has a frusto-conical shaped face 19; and the sides 21 of the band are of a complementary frusto-conical shape to form such tapered surfaces which slant inwardly and downwardly. Thus, when the ring members are brought together to clamp and compress the band, it can expand radially outwardly, so that its cylindrical peripheral surface 22 can expand into firm frictional engagement with equal pressure all around against the inside of core 7 when the chuck is mounted on the shaft. This is illustrated by the phantom lines in Fig. 4; and in this connection, it will be noted that peripheral surface 22 of the band normally extends beyond the peripheries of ring members 11 and 12 in the non-compressed state of the band.

Means is provided enabling axial relative movement of the rings so that they can be brought together to compress the band into frictional engagement with the core, or when it is desired to remove the chuck to allow release of the band. Such means comprises sets of alined apertures 23 in both of rings 11 and 12, adapted to receive with substantial clearance bolts 24 having heads 26 at one end engaging flange 14. At the opposite end, the bolts carry lock washers 27 and nuts 28 screwed thereon. By cinching the nuts, the rings can be brought together to compress and expand band 18 radially outwardly.

The chuck is also constructed so that when the rings 11 and 12 are brought together to compress band 18, the band is also free to expand radially inwardly to cause the chuck to grip firmly the shaft and prevent it from moving axially therealong, or turning thereon in case the shaft and apertures 17 are of cylindrical shape. To accomplish this, the inner male ring 11 which is the ring provided with hub 16, is diametrically split in half at 29 by being cut by any suitable means to form two half sections. Sufficient material is removed in the cutting to provide adequate play whereby when band 18 is compressed, inward radial expansion is also permitted to cause the described grip on the shaft. Since bolts 24 fit with clearance in apertures 23 of the rings, inward radial movement of the split sections of ring 11 is not impeded. Although four sets of bolt apertures 23 are shown, usually only two bolts 24 will suffice, one bolt for each of the split ring sections. For piloting the split sections of ring 11, a pair of diametrically opposite lugs 31 is provided on each section; and the lugs on one section carry pins 32 slidable in suitable recesses formed in the lugs on the other section.

When the chuck is assembled, the individual parts thereof need not be completely separated for positioning the assembly on or removing it from the shaft and core 7. If it is desired to remove the chuck from its operative position between the shaft and the core, all that is necessary is to loosen nuts 28 to relieve the compression on band 18 whereupon the chuck may be readily slipped off the shaft and out of the core, as the bolts hold the assembly together in the loosened state. When it is again desired to place the chuck in operative engagement between the shaft and a core, the assembly held together by the loosened bolts need only be placed in position between the parts, and the band can be expanded merely upon tightening of nuts 28 by a suitable wrench or the like.

In some cases, it may be desirable to use the chuck for mounting on a shaft which is non-rotatable. Fig. 5 illustrates such embodiment of the invention which is the same in principle as the embodiment already described, except that the band is prevented from expanding radially inwardly. The parts that correspond to those in the embodiment described have the same reference characters applied thereto. Shaft 3 is circular in cross-section and is removably mounted at its ends on supports (not shown). Conventional ball bearing assemblies 41 are positioned on rings 11 and 12; female ring 12 being provided with one bearing held in position against a flange 42 by retainer 43. Male ring 11 is not split and hence prevents band 18 from expanding radially inwardly. It is provided with two bearings held in position against a flange 44 by retainers 46.

The inner race of the outer bearing 41 on ring 11 has an outwardly projecting hub portion 47 in which is threaded cup pointed Allen set screw 48 adapted to engage in a recessed flat portion 49 formed on shaft 3. By loosening screw 48, the entire assembly can readily be slipped off the shaft; and in replacing the assembly on the shaft, it is held against axial movement upon tightening of the screw. In the embodiment of Fig. 5, tightening of bolts 24 serves in the manner described to expand band 18 radially outwardly into frictional engagement with the roll core. However, since ring 11 is not split, they need not fit with substantial clearance in ring apertures 23.

It will be noted that in all embodiments of the invention, no splining or keying other than the minor set screw of the Fig. 5 embodiment, is required in positioning the chuck on the shaft and effecting frictional grip with the core. When band 18 is compressed and expanded, pressure is distributed equally against the entire inside surface of the core, and against the shaft in the embodiment in Figs. 1 through 4, thus precluding slippage and effecting uniform transmission of the torque load when the paper is either wound or unwound. Furthermore, since the chuck consists essentially of few and simple parts, it can be quickly placed in operative position or removed, and is of economical construction.

I claim:

1. A core chuck comprising a pair of rings adapted to fit about a shaft, one of said rings having a hub portion piloted for axial slidable movement in a recess in the other of said rings, a circular band of elastic material between said rings supported by said hub portion all around the same, the inner side of each of said rings being of frusto-conical shape and the sides of said band being of complementary frusto-conical shape to provide cooperating tapered surfaces to facilitate outward radial expansion all around said band when said rings are moved axially relative to each other to clamp and compress said band, said rings having non-circular openings to fit without turning of said rings on a complementary cross-sectional shape of said shaft, and means enabling said axial movement of said rings.

2. A core chuck comprising a pair of rings adapted to fit about a shaft, one of said rings having a hub portion piloted for axial slidable movement in a recess in the other of said rings, a circular band of elastic material between said rings supported by said hub portion all around the same, the inner side of each of said rings being of frusto-conical shape and the sides of said band being of complementary frusto-conical shape to provide cooperating tapered surfaces to facilitate outward radial expansion all around said band when said rings are moved axially relative to each other to clamp and compress said band, said ring having the hub portion being split into a plurality of independent sections whereby when said band is compressed it can also expand radially inwardly to cause such ring to grip the shaft, and means enabling said axial movement of said rings.

3. A core chuck comprising a pair of rings adapted to fit about a shaft, one of said rings having a hub portion piloted for axial slidable movement in a recess in the other of said rings, a circular band of elastic material between said rings supported by said hub portion all around the same, the inner side of each of said rings being of frusto-conical shape and the sides of said band being of complementary frusto-conical shape to provide cooperating tapered surfaces to facilitate outward radial expansion all around said band when said rings are moved axially relative to each other to clamp and compress said band, said ring having the hub portion being split into a plurality of independent sections whereby when said band is compressed it can also expand radially inwardly to cause such ring member to grip the shaft, and means including bolts passing through said rings and clamping nuts thereon enabling said axial movement of said rings.

4. A core chuck comprising a pair of rings adapted to fit about a shaft, a circular band of elastic material between said rings, at least one of said rings and said band having cooperating tapered side surfaces to facilitate outward radial expansion all around said band when said rings are moved axially relative to each other to clamp and compress the band, means enabling said axial movement of said rings, and at least one of said rings being split into a plurality of independent sections whereby when said band is compressed it can also expand radially inwardly to cause such ring to grip the shaft.

5. A core chuck comprising a pair of rings adapted for positioning about a shaft, one of said rings having an inwardly projecting hub portion and the other of said rings having a recess in which said hub portion is piloted for axial slidable non-rotatable movement, said other ring having an end flange at its outer end bounding said recess, a circular band of elastic material between said rings supported by said hub portion all around the same, the inner side of each of said rings being of frusto-conical shape and the sides of said band being of complementary frusto-conical shape to provide cooperating tapered surfaces to facilitate outward radial expansion all around said band when said rings are moved axially relative to each other to clamp and compress the band; and means enabling axial movement of said rings and for holding the rings together comprising a plurality of bolts passing through apertures in said hub portion and through complementary apertures in said flange, and clamping nuts on said bolts.

6. A core chuck comprising a pair of rings adapted for positioning about a shaft, one of said rings having an inwardly projecting hub portion and the other of said rings having a recess in which said hub portion is piloted for axial slidable non-rotatable movement, said other ring having an end flange at its outer end bounding said recess, a circular band of elastic material between said rings supported by said hub portion all around the same, the inner side of each of said rings being of frusto-conical shape and the sides of said rings being of complementary frusto-conical shape to provide cooperating tapered surfaces to facilitate outward radial expansion all around said band when said rings are moved axially relative to each other to clamp and compress the band; said hub portion and said flange having non-circular openings to fit without turning of said rings on a complementary cross-sectional shape of said shaft, and said ring having the hub portion being split into a plurality of independent sections whereby when said band is compressed it can also expand radially inwardly to cause such ring to grip the shaft; and means enabling axial movement of said rings and for holding the rings together comprising a plurality of bolts passing through apertures in said hub portion and through complementary apertures in said flange, and clamping nuts on said bolts, said apertures in said split ring providing clearance for said bolts to provide for inward radial movement of said sections when said band is compressed.

7. A core chuck comprising a pair of rings adapted to fit about a shaft, one of said rings having a hub portion piloted for axial slidable movement in a recess in the other of said rings, a circular band of elastic material between said rings supported by said hub portion all around the same, the inner side of each of said rings being of frusto-conical shape and the sides of said band being of complementary frusto-conical shape to provide cooperating tapered surfaces to facilitate outward radial expansion all around the entire circumference of said band when said rings are moved axially relative to each other to clamp and compress said band, said ring having the hub portion being split into a plurality of independent sections whereby when said band is compressed it can also expand radially inwardly to cause such split ring to grip the shaft, means enabling axial movement of said rings and for holding said rings together comprising a plurality of bolts passing through apertures in said rings and clamping nuts on said bolts, said apertures in the split ring providing clearance for said bolts to provide for inward radial movement of said independent sections of said split ring when said band is compressed.

8. A core chuck comprising a pair of rings adapted to fit about a shaft, one of said rings having a hub portion piloted for axial slidable movement in a recess in the other of said rings, a circular band of elastic material between said rings supported by said hub portion all around the same, the inner side of each of said rings being of frusto-conical shape and the sides of said band being of complementary frusto-conical shape to provide cooperating tapered surfaces to facilitate outward radial expansion all around said band when said rings are moved axially relative to each other to clamp and compress said band, said ring having the hub portion being split into a plurality of independent sections whereby when said band is compressed it can also expand radially inwardly to cause such split ring to grip the shaft, means enabling axial movement of said rings and for holding the rings together comprising a plurality of bolts passing through apertures in both of said rings and clamping nut on said bolts, said apertures in said split ring providing clearance for said bolts to provide for inward radial movement of said independent sections of said split ring when said band is compressed, and means for piloting said independent sections during radial movement thereof comprising a recessed portion in one of said independent sections in cooperative alignment with a pin mounted on another of said sections.

9. The construction of claim 5 in which each of the rings is provided with bearing means for rotatably supporting each of the rings on a shaft, and means is provided for holding the chuck against axial movement on said shaft.

References Cited in the file of this patent

UNITED STATES PATENTS

| | | |
|---|---|---|
| 163,217 | Lawson | May 11, 1875 |
| 1,216,244 | McDowell | Feb. 13, 1917 |
| 1,810,403 | Rupp | June 16, 1931 |
| 2,209,737 | Livingston | July 30, 1940 |
| 2,466,974 | Stupakoff et al. | Apr. 12, 1949 |
| 2,647,701 | Cannard | Aug. 4, 1953 |